United States Patent
Christensen et al.

(10) Patent No.: US 6,375,916 B2
(45) Date of Patent: Apr. 23, 2002

(54) PROCESS FOR THE AUTOTHERMAL REFORMING OF A HYDROCARBON FEEDSTOCK CONTAINING HIGHER HYDROCARBONS

(75) Inventors: Thomas Sandahl Christensen; Jens-Henrik Bak Hansen, both of Lyngby; Peter Seier Christensen; Ivar Ivarsen Primdahl, both of Copenhagen NV, all of (DK)

(73) Assignee: Haldor Topsoe A/S, Lyngby (DK)

( * ) Notice: Subject to any disclaimer, the term of this patent is extended or adjusted under 35 U.S.C. 154(b) by 0 days.

(21) Appl. No.: 09/404,778

(22) Filed: Sep. 24, 1999

(30) Foreign Application Priority Data

Sep. 25, 1998 (DK) .......................... 1998 01211

(51) Int. Cl.⁷ .......................... C01D 7/00; C01D 15/08; C01B 31/24; C01B 3/26; C07C 1/02
(52) U.S. Cl. ................ 423/418.2; 423/652; 252/373
(58) Field of Search ................ 423/650, 651, 423/418.2, 652; 252/373

(56) References Cited

U.S. PATENT DOCUMENTS

| | | | |
|---|---|---|---|
| 4,631,182 A | * 12/1986 | Tottrup et al. | 423/652 |
| 5,492,649 A | * 2/1996 | Christensen | 252/373 |
| 5,496,170 A | 3/1996 | Primdahl et al. | 431/187 |
| 5,997,835 A | * 12/1999 | Hyldtoft et al. | 423/418.2 |

FOREIGN PATENT DOCUMENTS

EP 0855366 7/1998

OTHER PUBLICATIONS

T.S. Christensen, et al., "Improve Syngas Production Using Autothermal Reforming", *Hydrocarbon Processing*, Mar. 1994.

* cited by examiner

*Primary Examiner*—Wayne Langel
*Assistant Examiner*—Jonas N. Strickland
(74) *Attorney, Agent, or Firm*—Dickstein, Shapiro Morin & Oshinsky, LLP

(57) ABSTRACT

Process for preparation of a hydrogen and/or carbon monoxide rich gas by catalytic autothermal reforming of a hydrocarbon feedstock containing higher hydrocarbons in an autothermal reformer comprising the further steps of (a) passing the hydrocarbon feedstock through a reactor containing steam reforming catalyst to remove or reduce the contents of higher hydrocarbons in the hydrocarbon feedstock;
(b) passing the effluent from the first reactor to an autothermal reformer; and
(c) withdrawing from the autothermal reformer a product gas rich in hydrogen and carbon monoxide.

4 Claims, No Drawings

PROCESS FOR THE AUTOTHERMAL REFORMING OF A HYDROCARBON FEEDSTOCK CONTAINING HIGHER HYDROCARBONS

BACKGROUND OF THE INVENTION

The present invention is directed to soot free autothermal reforming (ATR) of hydrocarbon feed containing higher hydrocarbons.

In the autothermal reforming, combustion of hydrocarbon feed is carried out with substoichiometric amounts of oxygen by flame reactions in a burner combustion zone and, subsequently, steam reforming of the partially combusted feedstock in a fixed bed of steam reforming catalyst. Substoichiometric combustion of hydrocarbons leads disadvantageously to formation of soot. Soot formation may be avoided by using a specific burner design and through controlling the operating conditions of the ATR process. Soot is formed in the flame of an autothermal reactor within certain ranges of operating conditions. When the amount of steam relative to the other components send to the ATR reactor is under a critical value, soot is formed in the reacting feed. One such burner useful in ATR is described in U.S. Pat. No. 5,496,170. The limiting amount of steam can be expressed as the critical steam to carbon ratio, which is the molar feed flow rate of steam to the molar flow rate of carbon in the hydrocarbon feed. The hydrocarbon feedstocks can be in form of natural gas or hydrocarbon including LPG, butane, naphtha, etc. The molar flow rate of carbon is calculated as the molar flow rate of the hydrocarbon times the carbon contents of the hydrocarbon.

Examples of operation conditions, which do not result in soot formation, are summarized in a paper by Christensen and Primdahl (Hydrocarbon processing, March 1994, pages 39–46). Those conditions are shown in Table 1. The tests have been conducted in a pilot plant. Due to heat loss from the relatively small pilot unit, the adiabatic ATR exit temperature will be higher than the measured ATR exit temperature. This means that if a large unit, from which the heat loss is negligible, is subjected to the exact same operating conditions, the ATR exit temperature will be close to the adiabatic ATR exit temperature. The soot precursors are formed in the combustion zone of the ATR. Most of the heat loss occurs after the combustion zone. A subsequent heat loss cannot have any influence on the reactions in the combustion zone. The oxygen to carbon ratio ($O_2/C$) is also shown in Table 1. The definition of this ratio is analogue to the steam to carbon ratio, however, with steam substituted by oxygen. The exit temperature from the ATR reactor can be calculated from the $O_2/C$ ratio, when the heat loss from the reactor is known.

TABLE 1

| Case No. | Oxygen to Carbon Ratio | $H_2O/C$ | $CO_2/C$ | Measured ATR Exit Temp. ° C. | Adiabatic ATR Exit Temp. ° C. |
|---|---|---|---|---|---|
| A | 0.60 | 1.43 | 0 | 950 | 1013 |
| B | 0.62 | 0.59 | 0 | 1065 | 1173 |
| C | 0.60 | 0.86 | 0 | 1000 | 1073 |
| D | 0.67 | 0.68 | 0.47 | 1018 | 1147 |
| E | 0.70 | 0.67 | 0.75 | 1030 | 1147 |
| F | 0.73 | 0.58 | 0.98 | 1028 | 1177 |

Operation conditions which do not result in soot formation (from Christensen and Primdahl, 1994)

Advantageously, the process is operated at low steam to carbon ratios, since a low ratio lowers the investment expenses for an ATR plant and reduces the necessary energy consumption in operating the plant. Additionally, a low steam to carbon ratio makes it possible to optimize the produced synthesis gas composition for production of CO-rich gases for e.g. methanol or dimethyl ether synthesis and Fischer-Tropsch processes.

It has been found that arranging a low temperature reforming reactor with steam reforming catalyst upstream the autothermal reformer reduces the critical steam to carbon ratio. The steam reforming reactor removes or reduces the content of higher hydrocarbons. Higher hydrocarbons are hydrocarbons that consist of two or more carbon atoms. The steam reforming catalyst will convert the higher hydrocarbons to a mixture of methane, carbon monoxide, carbondioxide and hydrogen.

The low temperature steam reforming reactor can be an adiabatic prereformer or a heated prereformer, e.g. in form of a catalyzed heat exchanger coil as described in European Patent Publication No. 855,366. The exit temperature of an effluent stream from the low temperature steam reforming reactor is not higher than 600° C.

Accordingly, this invention provides a process for the preparation of a hydrogen and/or carbon monoxide rich gas by catalytic autothermal reforming of a hydrocarbon feedstock in an autothermal reformer comprising further steps of:

(a) passing the hydrocarbon feedstock through a first reactor containing steam reforming catalyst to substantially remove the content of higher hydrocarbons in the hydrocarbon feedstock;

(b) passing the effluent from the first reactor to an autothermal reformer; and (c) withdrawing from the autothermal reformer a product gas rich in hydrogen and carbon monoxide.

As an advantage of the invention it will be possible to operate the autothermal reactor at lower steam to carbon ratio than when using the unconverted feed stream as feed for the autothermal reformer.

As a second advantage, it is possible to preheat the feed gas for the ATR to a higher temperature when it contains no higher hydrocarbon. This results in a lower oxygen consumption by the process.

The invention is in particular useful in the steam reforming of accociated gas. Associated gas is natural gas produced during oil production. This gas is usually flared at the drilling rig, since it is not economical to ship associated gas. Associated gas has a high content of higher hydrocarbons.

EXAMPLE 1

The test unit consists of a system for providing the feeds to the ATR reactor, the ATR reactor and equipment for post treatment of the product gas.

The feed streams consist of natural gas, steam, oxygen, hydrogen and optionally butane. The composition of the natural gas is given in Table 2. All gases are compressed to the operating pressure and preheated to the operating temperature. The natural gas is desulphurized before entering the ATR reactor. The feeds are combined into two streams and send to the burner of the ATR. A first feed stream contains natural gas, hydrogen, steam, and optionally butane. This feed stream is heated to 500° C. The other feed stream contains oxygen and steam and is heated to 220° C. The pressure in the ATR reactor is 2.46 MPa. Optionally, the natural gas containing stream is passed through a prereformer before entering the ATR reactor. Also in this case, the gas stream is heated to 500° C. before entering the ATR reactor.

TABLE 2

| Component | Mole fraction % |
|---|---|
| $N_2$ | 0.42 |
| $CO_2$ | 1.16 |
| $CH_4$ | 94.55 |
| $C_2$ | 2.75 |
| $C_3$ | 0.70 |
| $C_4$ | 0.31 |
| $C_5^+$ | 0.11 |

Composition of natural gas

In the ATR reactor, the substoichiometric combustion and subsequent catalytic steam reforming and shift reactions are carried out. The inlet and exit gas compositions are measured by gaschromatography.

Downstream the ATR reactor, the product gas is cooled and the majority of the steam content of the product gas is condensed. If soot is formed, it is captured in the condensate. The condensate is subjected to both gravimetric and spectrophotometric examinations.

The following tests were carried out to demonstrate the influence of passing the feed gas through a prereformer. In one test the feed gas was doped with butane. The butane concentration was 4.0 vol % of the total hydrocarbon.

Each test was made by approaching the critical steam to carbon ratio from the steam rich side. The tests were initiated with a sufficiently high steam flow to ensure soot free conditions. The steam flow was then decreased in steps. The system was allowed to become stable, after which the condensate was examined for soot content. If the condensate was still soot free, the next step was taken. Term "soot free conditions" refers to condition in which the soot formation is negligible. The soot amount formed at the critical steam to carbon ratio is approximately 3–5 ppm.

The carbon flow rates were in the below described tests 100–103 $Nm^3/h$. The hydrogen flow rate was 2 $Nm^3/h$. The steam flow was adjusted to obtain the given steam to carbon ratio. The oxygen flow rate was adjusted to obtain the desired operating temperature in the range from 55 to 58 $Nm^3/h$.

Due to heat loss from the relatively small pilot, the adiabatic ATR exit temperature will be higher than the temperature given in Table 3. A large industrial unit will be very close to adiabatic condition and the exit temperature from such a unit will, hence, be very close to the adiabatic given in Table 3 when the industrial unit otherwise is operated at exactly the same conditions as quoted in Table 3.

TABLE 3

| Test No | Pre-reformer | Doped with butane | $O_2/C$ | ATR exit temp.° C. | Adiabatic exit temp.° C. | Critical steam to carbon ratio |
|---|---|---|---|---|---|---|
| 1.1 | No | No | 0.56 | 954 | 1019 | 0.70 |
| 1.2 | Yes | No | 0.56 | 951 | 1011 | 0.64 |
| 1.3 | No | Yes | 0.55 | 948 | 1006 | 0.79 |

The composition of the product gas from the ATR reactor in the tests of Table 3 was measured by gaschromatography. The gas compositions are shown in Table 4. Gas composition is given as dry mole percentage, which is the mole composition of the gas components when steam is not included.

TABLE 4

| Test No | $H_2$ % | $N_2$ % | CO % | $CO_2$ % | $CH_4$ % |
|---|---|---|---|---|---|
| 1.1 | 64.4 | 0.14 | 26.74 | 6.81 | 1.87 |
| 1.2 | 65.1 | 0.12 | 25.17 | 6.99 | 2.62 |
| 1.3 | 64.5 | 0.12 | 26.09 | 7.67 | 1.62 |

Composition of product gas (dry mole %) of the test of Table 3

It is seen from Table 3, when passing the feed steam through a prereformer the critical steam to carbon ratio decreases. Furthermore, it is shown that an increased content of butane in the feed gas to the ATR causes the critical steam to carbon ratio to increase. This means that the advantage of passing the feed through a prereformer will increase, if the feed contains larger amount of higher hydrocarbon.

EXAMPLE 2

The same test unit as in Example 1 was used. Ethane or butane is added to the natural gas containing feed stream in test run 2 and 3.

The carbon flow rates were in the below described tests 102–103 $Nm^3/h$. The hydrogen flow rate was 3 $Nm^3/h$. The steam flow was adjusted to obtain the given steam to carbon ratio. The oxygen flow rate was adjusted to obtain the desired operating temperature and was in the interval 58–60 $Nm^3/h$.

TABLE 5

| Test No | Doped | Hydrocarbon | Concentration Vol % of total hydrocarbon | $O_2/C$ | ATR exit temp.° C. | Adiabatic exit temp.° C. | Critical steam to carbon ratio |
|---|---|---|---|---|---|---|---|
| 2.1 | No | | | 0.58 | 1027 | 1109 | 0.33 |
| 2.2 | Yes | Ethane | 7.2 | 0.58 | 1024 | 1113 | 0.41 |
| 2.3 | Yes | Butane | 5.1 | 0.57 | 1023 | 1118 | 0.47 |

The composition of the product gas from the ATR reactor in the tests of Table 5 are shown in Table 6.

TABLE 6

| Test No | $H_2$ % | $N_2$ % | CO % | $CO_2$ % | $CH_4$ % |
|---|---|---|---|---|---|
| 2.1 | 62.9 | 0.14 | 31.1 | 4.33 | 1.52 |
| 2.2 | 63.0 | 0.14 | 30.9 | 4.74 | 1.25 |
| 2.3 | 63.3 | 0.21 | 30.5 | 4.71 | 1.25 |

Composition of product gas (dry mole %) of the tests of Table 5

It is seen from Table 5 that a higher content of both ethane and butane causes the critical steam to carbon ratio to increase.

What is claimed is:
1. Process for the preparation, with suppression of soot formation, of a hydrogen and/or carbon monoxide rich gas by catalytic autothermal reforming of a hydrocarbon feedstock containing higher hydrocarbons comprising the steps of:

(a) passing the hydrocarbon feedstock through a first reactor containing steam reforming catalyst to obtain an effluent stream wherein the contents of higher hydrocarbon in the hydrocarbon feedstock are removed or reduced;

(b) passing said effluent from the first reactor as a feed together with oxygen and steam to an autothermal reformer wherein said effluent is partially oxidized with said oxygen by flame reactions; and (c) withdrawing from the autothermal reformer a product rich gas in hydrogen and carbon monoxide, substantially free of soot.

2. Process of claim 1, wherein the hydrocarbon feedstock is natural gas and/or associated gas.

3. Process according to claim 2, wherein the temperature of the effluent at outlet of the first reactor is below 600° C.

4. Process according to claim 1, wherein the temperature of the effluent at outlet of the first reactor is below 600° C.

* * * * *